UNITED STATES PATENT OFFICE.

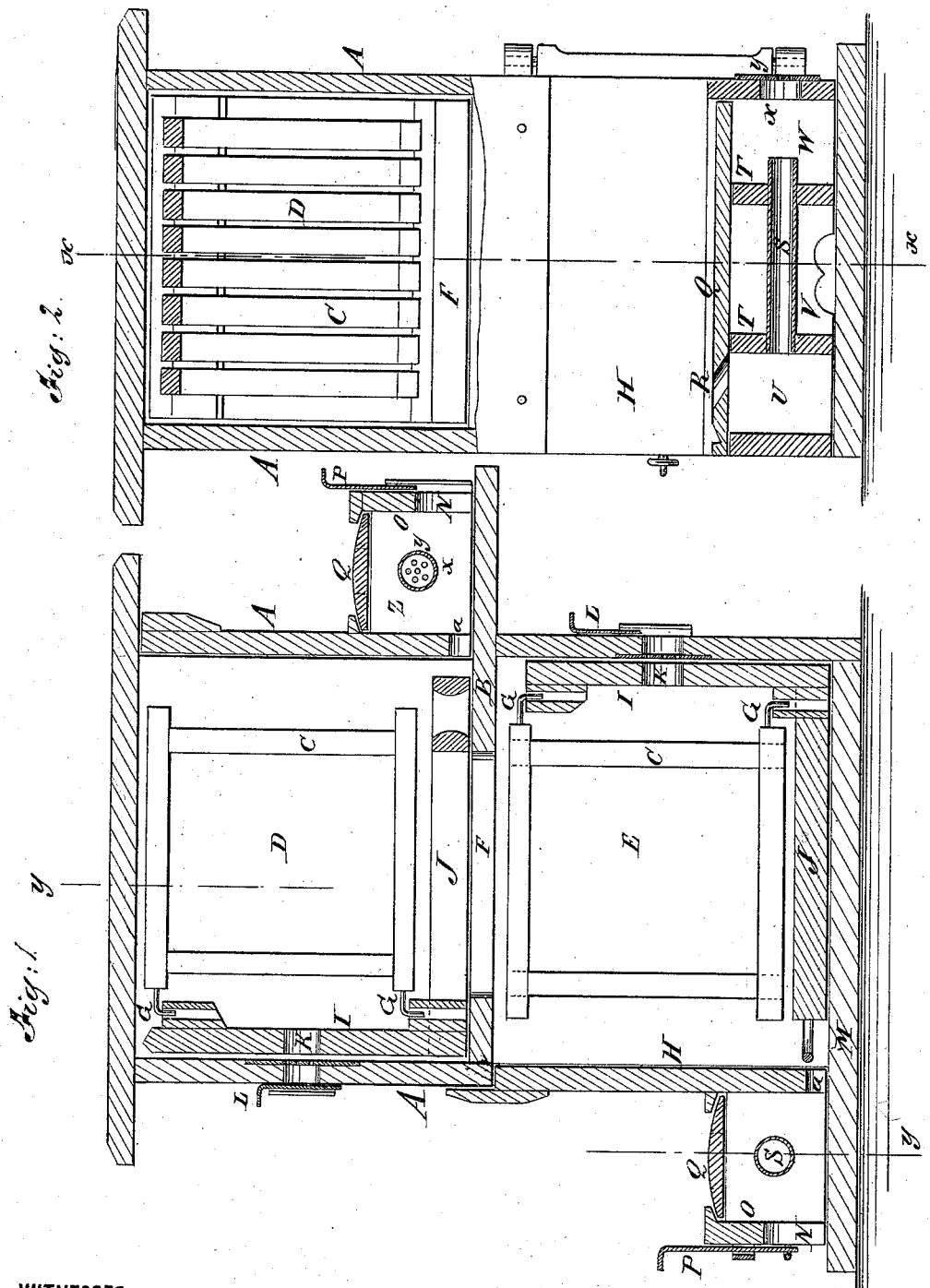

BENJAMIN F. DANIEL, OF QUINCY, FLORIDA.

IMPROVEMENT IN MOTH-TRAPS.

Specification forming part of Letters Patent No. 169,966, dated November 16, 1875; application filed July 3, 1875.

*To all whom it may concern:*

Be it known that I, BENJAMIN F. DANIEL, of Quincy, in the county of Gadsden and State of Florida, have invented a new and useful Improvement in Bee-Hives, of which the following is a specification:

This invention relates to bee-hives; and consists in the construction of a simple and perfect moth-trap, as will be hereinafter more fully described.

Figure 1 is a vertical section of the hive taken on the line *x x* of Fig. 2. Fig. 2 is a vertical section taken on the line *y y* of Fig. 1.

Similar letters of reference indicate corresponding parts.

A represents the walls of the hive. A' is the cap, thus forming a box of nearly square form in cross-section, divided by a perforated horizontal partition, B, making an upper and lower compartment, which compartments are provided with honey-frames C. D is the upper and E the lower compartment. F represents grated openings in the partition B, by means of which the bees pass from one to the other of the compartments. The honey-frames C of each compartment are attached by the hooks G, so that they may be drawn out from each compartment together, or any one of the frames may be unhooked and drawn out separately by opening the hinged doors H H. The upper frames are attached to a cleated upright piece, I, which is attached to the open sliding bed-piece J at right angles. The lower frames are attached to the two right-angled pieces in the same manner, but the bed-piece J is solid. K K are apertures, closed by the slides L, for admitting air to the compartments. M is the bottom of the hive, which projects from one side and supports the bee-entrance N and the lower moth-trap. O is the front piece, in which is the lower bee-entrance, which orifice is closed, when desired, by the vertical slide P. Q is a sliding cover, (see Fig. 2,) through which is an angular orifice, R. The moth seeks access to the hive through this orifice. S is a tube supported by the two vertical partitions T T. These partitions divide the trap into the compartments U, V, and W. The moth enters U and passes through the tube and finds himself in the compartment W, but cannot find access to the line or bee-entrance. X is an aperture, screened by the perforated plate Y. The upper bee-entrance and moth-trap Z is made in the same manner. The bees find access to the hive from the compartment V (beneath the moth-tube S) through the openings *a a*.

This hive is simple in construction, and is cheaply made, and suits the habits of the bee better than hives of more complicated and costly construction.

Having thus described my invention, I claim as new and desire to secure by Letters Patent—

A moth-trap, composed of the compartments U, V, and W, and tube S, as shown and described.

BENJAMIN FRANKLIN DANIEL.

Witnesses:
EDWARD OWENS,
C. E. L. ALLISON.